(12) United States Patent
Bhuyan

(10) Patent No.: US 11,444,664 B2
(45) Date of Patent: Sep. 13, 2022

(54) SYSTEM AND METHOD FOR SELECTIVE TRANSMISSION AND RECEPTION FOR STATIONARY WIRELESS NETWORKS

(71) Applicant: Energy, United States Department of, Washington, DC (US)

(72) Inventor: Arupjyoti Bhuyan, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 4 days.

(21) Appl. No.: 17/028,005

(22) Filed: Sep. 22, 2020

(65) Prior Publication Data

US 2022/0094396 A1 Mar. 24, 2022

(51) Int. Cl.
| | |
|---|---|
| *H04B 7/0426* | (2017.01) |
| *H04W 72/04* | (2009.01) |
| *H04L 9/40* | (2022.01) |
| *H04B 7/06* | (2006.01) |
| *H04W 12/12* | (2021.01) |
| *H04W 12/63* | (2021.01) |
| *H04W 12/71* | (2021.01) |

(52) U.S. Cl.
CPC ........... *H04B 7/043* (2013.01); *H04B 7/0617* (2013.01); *H04L 63/1466* (2013.01); *H04W 12/12* (2013.01); *H04W 12/63* (2021.01); *H04W 12/71* (2021.01); *H04W 72/046* (2013.01); *H04W 72/0446* (2013.01)

(58) Field of Classification Search
CPC ... H04B 7/043; H04B 7/0617; H04L 63/1466; H04W 12/12; H04W 12/63; H04W 12/71; H04W 72/0446; H04W 72/046
See application file for complete search history.

(56) References Cited

U.S. PATENT DOCUMENTS

| | | | | |
|---|---|---|---|---|
| 2009/0214216 | A1* | 8/2009 | Miniscalco | H04B 7/18506 398/99 |
| 2011/0159801 | A1* | 6/2011 | Maltsev | H04L 27/2626 455/7 |
| 2012/0322388 | A1* | 12/2012 | Sawai | H04B 7/0617 455/67.11 |
| 2019/0313440 | A1* | 10/2019 | John Wilson | H04J 11/0079 |
| 2019/0334636 | A1* | 10/2019 | Li | H01P 1/184 |

* cited by examiner

*Primary Examiner* — Kenneth T Lam
(74) *Attorney, Agent, or Firm* — Felisa L. Leisinger; Michael J. Dobbs; Brian J. Lally

(57) ABSTRACT

A system and methods for selective transmission and reception for stationary wireless networks. The system and method include an end user equipment, a primary base station, a core network, and a selective server. The end user equipment transmits a request for transmission to the primary base station receiver. The primary base station authenticates the end user equipment using a cellular network authentication process. The primary base station then searches for a time slot data for the end user equipment from the selective server and determines whether the time slot is open for transmission, steers a beam towards the end user equipment when time slot is open for transmission. The primary base station then enables transmission from the end user equipment, wherein the enabling is performed by the primary base station. The core network receives the transmission from the end user equipment.

13 Claims, 10 Drawing Sheets

Server Memory 141

Base Station Look Up Table 305

Base Station Location Data 310

Base Station Identification Data 315

User Equipment Look Up Table 320

User Equipment Location Data 325

Time Slot Data 330

User Equipment Identification Data 335

Figure 3A

SYSTEM AND METHOD FOR SELECTIVE TRANSMISSION AND RECEPTION FOR STATIONARY WIRELESS NETWORKS

GOVERNMENT INTERESTS

The United States Government has rights in this invention pursuant to Contract No. DE-AC07-05ID14517, between the U.S. Department of Energy (DOE) and Battelle Energy Alliance.

FIELD OF THE INVENTION

The present invention relates to a system and method for selective transmission and reception for stationary wireless networks.

BACKGROUND OF THE INVENTION

The secure transmission and reception of wireless data along with the optimal use of available spectrum are two major areas of interest to many industries, businesses, as well as public organizations. Currently, intruders can "listen in" to the wireless transmission or imitate one of the end users for the wireless transmission for malicious purposes. Advanced cellular standards, such as LTE, use standardized mechanisms like authentication and data ciphering to secure the wireless communications. However, LTE is not a prevalent mechanism in many non-cellular communications. Furthermore, industries such as electric utilities and other utilities do not have FCC allocated spectrum for their communications needs. Therefore, there is a need in these situations is to be able to receive and transmit without allowing interference or conflicting with other user transmissions in the same spectrum band.

SUMMARY OF THE INVENTION

According to one aspect of the invention, a system and a method for selective transmission and reception for stationary wireless networks is provided. The system and method have an end user equipment, a primary base station, a core network, and a selective server. The end user equipment transmits a request for transmission to the primary base station receiver. The primary base station authenticates the end user equipment using a cellular network authentication process. The primary base station then searches for a time slot data for the end user equipment from the selective server and determines whether the time slot is open for transmission, steers a beam towards the end user equipment when time slot is open for transmission. The primary base station then enables transmission from the end user equipment, wherein the enabling is performed by the primary base station. The core network receives the transmission from the end user equipment.

Another embodiment of the present invention provides a method of intruder listening performed by a base station. The method includes a primary base station and a selective server. The primary base station monitors all transmissions from an end user equipment that are allocated to specific slots in a radio frame. The primary base station then compares the time slot of transmission from the end user equipment to a time slot data. The timeslot data contains pre-allocated time slots. The primary base station discontinues the transmission from the end user equipment when the time slot of transmission is not contained in the time slot data.

BRIEF DESCRIPTION OF THE DRAWINGS

Embodiments of the present invention are illustrated in the accompanying figures where:

FIG. 3A illustrates the server memory of the selective server according to an embodiment of the present invention;

DETAILED DESCRIPTION OF THE INVENTION

The following detailed description provides illustrations for embodiments of the present invention. Those skilled in the art will recognize that other embodiments for carrying out or practicing the present invention are also possible.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. The term "and" is used herein in the disjunctive and conjunctive senses to mean any and all combinations of one or more of the associated listed items, and the singular forms "a", "an and" the are intended to include the plural forms as well unless the context dearly indicates otherwise. It should also be noted that in some alternative implementations, the functions/acts noted for exemplary methods may occur out of the order noted in the figures. For example, two figures shown in succession may, in fact, be executed substantially concurrently or may sometimes be executed in the reverse order, depending upon the functionality or acts involved.

Figure 1:
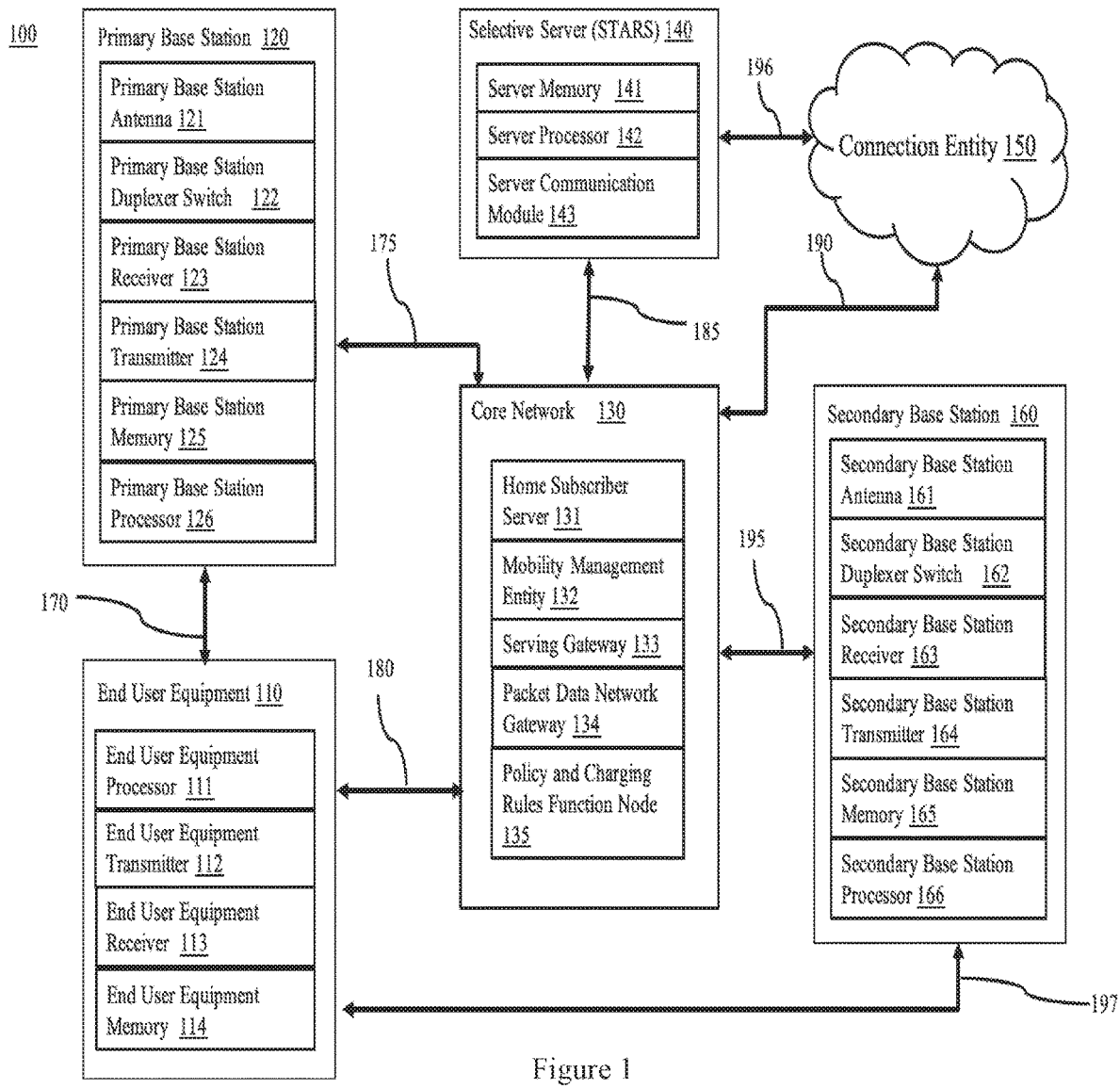
FIG. 1 is a schematic of a first embodiment of a system for selective transmission and reception for stationary wireless networks.

FIG. 1 illustrates a selective wireless transmission system 100 according to an embodiment of the present invention. The selective wireless transmission system 100 involves six main components: an end user equipment 110, a primary base station 120, a core network 130, a selective server 140, a connection entity 150, and a secondary base station 160.

The end user equipment 110 further includes an end user equipment processor 111, an end user equipment transmitter 112, an end user equipment receiver 113, and an end user equipment memory 114.

The primary base station 120 further includes a primary base station antenna 121, a primary base station duplexer switch 122, a primary base station receiver 123, a primary base station transmitter 124, a primary base station memory 125, and a primary base station processor 126.

The selective server 140 further includes a server memory 141, a server processor 142, and a server communication module 143.

The core network 130 further includes a home subscriber server 131, a mobility management entity 132, a serving gateway 133, a packet data network gateway 134, and a policy and charging rules function node 135.

The secondary base station 160 further includes a secondary base station antenna 161, a secondary base station duplexer switch 162, a secondary base station receiver 163, a secondary base station transmitter 164, a secondary base station memory 165, and a secondary base station processor 166.

In an embodiment of the selective wireless transmission system 100, the end user equipment 110 is in wireless communication with the primary base station 120, the core network 130, and the secondary base station 160 through network connections 170, 180, and 197 respectively. The end user equipment processor 111 is electronically coupled with the end user equipment transmitter 112, the end user equipment receiver 113, and the end user equipment memory 114. The end user equipment transmitter 112 is electronically coupled with the end user equipment receiver 113 and the end user equipment memory 114. The end user equipment receiver 113 is electronically coupled with the end user equipment memory 114.

In addition, the primary base station 120 is in wired communication with the core network 130 through connection 175. Connection 175 from the primary base station 120 to the core network 130 is in most cases with high capacity wired network such as a fiber IP network. This network can contain many IP switches that concentrates hundreds of base stations served by a single core network. The primary base station antenna 121 is electronically coupled with the primary base station duplexer switch 122. The primary base station duplexer switch 122 is electronically coupled with the primary base station receiver 123 and the primary base station transmitter 124. The primary base station memory 125 is electronically coupled with the primary base station receiver 123, the primary base station transmitter 124, and the primary base station processor 126. The primary base station processor 126 is electronically coupled to the primary base station receiver 123 and the primary base station transmitter 124.

Additionally, the home subscriber server 131 is electronically coupled with the mobility management entity 132, the serving gateway 133, the packet data network 134, and the policy and charging rules function node 135. The mobility management entity 132 is electronically coupled with the serving gateway 133, the packet data network 134, and the policy and charging rules function node 135. The serving gateway 133 is electronically coupled with the packet data network 134, and the policy and charging rules function node 135. The packet data network 134 is electronically coupled with the policy and charging rules function node 135.

In addition, the selective server 140 is in wireless communication with the core network 130 and the connection entity 150 through network connections 185 and 196 respectively. The server memory 141 is electronically coupled with the server processor 142 and the server communication module 143. The server processor 142 is electronically coupled with the server communication module 143. The connection entity 150 is in wireless communication with the core network through network connection 190.

In addition, the secondary base station 160 is in wired communication with the core network 130 through connection 195. Connection 195 from the primary base station 120 to the core network 130 is in most cases with high capacity wired network such as a fiber IP network. This network can contain many IP switches that concentrates hundreds of base stations served by a single core network. The secondary base station antenna 161 is electronically coupled with the secondary base station duplexer switch 162. The secondary base station duplexer switch 162 is electronically coupled with the secondary base station receiver 163 and the secondary base station transmitter 164. The secondary base station memory 165 is electronically coupled with the secondary base station receiver 163, the secondary base station transmitter 164, and the secondary base station processor 166. The secondary base station processor 166 is electronically coupled to the secondary base station receiver 163 and the secondary base station transmitter 164.

In operation, the selective wireless transmission system 100 involves six main components: an end user equipment 110, a primary base station 120, a core network 130, a selective server 140, a connection entity 150, and a secondary station 160. Upon initial use, the end user equipment 110, the primary base station 130, and the selective server 140 are initialized and connected to the core network 130. (Further discussed in FIG. 4, FIG. 5, and FIG. 6). When a transmission is to be sent, the end user equipment transmitter 112 transmits a request for transmission to the primary base station receiver 123. The primary base station processor 126 authenticates the end user equipment 110 with a normal cellular network authentication process. Specifically, the core network 130 is a network that uses Internet Protocol (IP) and Ethernet-based packet switched communication. The primary base station 120 transmits the user equipment identification data 335 to the mobility management entity 132. The mobility management entity 132 is the key control-node for the LTE access-network responsible for authenticating the user by interacting with the home subscriber server 131. The home subscriber server 131 is responsible for idle mode end user equipment 110 tracking and paging procedure including retransmissions. Mobility management schemes are used to ensure connectivity and to keep the IP addresses of users unchanged, even when the end user equipment 110 move and changes its network. The serving gateway 133 serves as a mobility management anchor and has to maintain a high number of states related to the mobile users. The serving gateway 133 is connected to the packet data network gateway 134, which links the core network 130 to the connection entity 150. The home subscriber server 131 is a central database that contains information about all of the network operators' subscribers for handing calls and sessions. The core network 130 determines whether the user equipment identification data 335 is contained within the home subscriber server 131. If the user equipment identification data 335 is contained within the home subscriber server 131, then the end user equipment 110 is successfully authenticated. Additionally, the packet data network gateway 134 performs several functions such as monitoring, billing, access control, and enforcement of varied policies. The home subscriber server 131 is in charge of storing and updating, when necessary, the database containing all the user subscription information, including: user identification and addressing (this corresponds to the International Mobile Subscriber Identity and Mobile Subscriber ISDN Number or mobile telephone number) and the user profile information (this includes service subscription states and user-subscribed quality of service information). The policy control and charging rules function node 135 is responsible for policy control decision-making, as well as for controlling the flow-based charging functionalities in the Policy Control Enforcement Function, which is contained in the packet data network gateway 134. The policy control and charging rules function node 135 provides the QoS authorization (QoS class identifier [QCI] and bit rates) that decides how a certain data flow will be treated in the Policy Control Enforcement Function and ensures that this is in accordance with the user's subscription profile.

In further operation, the primary base station 120 looks up the time slot data 330 (further discussed in FIG. 3) for the end user equipment 110 based on the user equipment location data 325 and the user equipment identification data 335 from the user equipment look up table 320 in the server memory 141. Specifically, the time slot data 330 is calculated using the function $T'=(N-1)*T_s$, where T' is the time period to cover the entire RF coverage area by the primary base station 120, N is a time variable, and $T_s$ is the time period to cover one group of end user equipment 110. The primary base station processor 126 then determines whether the requested time slot is open for transmission. If the time slot is not open, then the primary base station processor 126 waits until the time slot becomes available. If the time slot is available, then the primary base station processor 126 steers the beam 210 towards the end user equipment 110. The transmission and reception from the end user equipment 110 is enabled. The transmission from the end user equipment 110 is then transmitted through the core network 130. (See discussion in FIG. 1).

In further operation, an external program initiates an incoming call. The core network 130 then determines whether the end user equipment 110 is within the same RF coverage as the primary base station 120. If the primary base station 120 is within the same RF coverage, then the core network 130 transmits a signal to the primary base station 120 to steer the beam 210 towards the end user equipment 110. The primary base station 120 then steers the beam 210 to the end user equipment 110. If the primary base station 120 is not within the same RF coverage, then the core network 130 transmits a signal to the secondary base station 160 to steer the beam 210 towards the end user equipment 110. The secondary base station 160 then steers the beam 210 to the end user equipment 110. The transmission and the reception of the end user equipment 110 is turned on. The end user equipment receiver 113 receives the transmission. The end user equipment 110 then sends a signal to the core network 130 to terminate the transmission assigned to the time slot data 330.

In further operation, the primary base station 120 monitors for all transmissions from the end user equipment 110 that are allocated to specific slots in the radio frame. The primary base station 120 determines whether there are any transmissions from the end user equipment 110 that use slots other than pre-allocated ones. Specifically, the selective server 140 transmits the time slot data 330 to the primary base station 120. The primary base station 120 then determines whether a given transmission is not contained within the time slot data 330. If a given transmission is not contained within the time slot data 330, then the primary base station 120 discontinues the processing of the transmission and sends an alert to the network operator. The primary base station 120 stores the data from the illegal transmissions as user equipment identity data 350 and transmission time data 355, for subsequent forensic analysis of possible attacks by spoofing a legal user in the primary base station memory 125 in the attack database 380.

In an alternate embodiment, one primary base station 120 serves hundreds of end user equipment 110 that is covered by its RF signals.

In an alternative embodiment of the present invention, the wireless connections 170, 180, 185, 196, and 190 are LTE connections, Bluetooth connections, Wi-Fi connections, LAN connections, network connections, or other similar connections.

In an alternative embodiment of the present invention, the wired connections 180 and 195 are LTE connections, Bluetooth connections, Wi-Fi connections, LAN connections, network connections, or other similar connections.

In an alternative embodiment of the present invention, the end user equipment transmitter 112 and the end user equipment receiver 113 is a transceiver.

In an alternative embodiment of the present invention, the primary base station transmitter 124 and the primary base station receiver 123 is a transceiver.

In an alternative embodiment of the present invention, the secondary base station transmitter 164 and the secondary base station receiver 163 is a transceiver.

In an alternative embodiment of the present invention, the selective server 140 includes more than one server.

In an alternative embodiment of the present invention, the end user equipment 110 is but not limited to a smartphone, tablet, or any other portable electronic device.

In an alternative embodiment of the present invention, the end user equipment 110 is a stationary electronic device.

In an alternative embodiment of the present invention, the connections between the end user equipment 110 and the primary base station 120 and between the selective server 140 and the core network 130 are wired connections.

Figure 2:
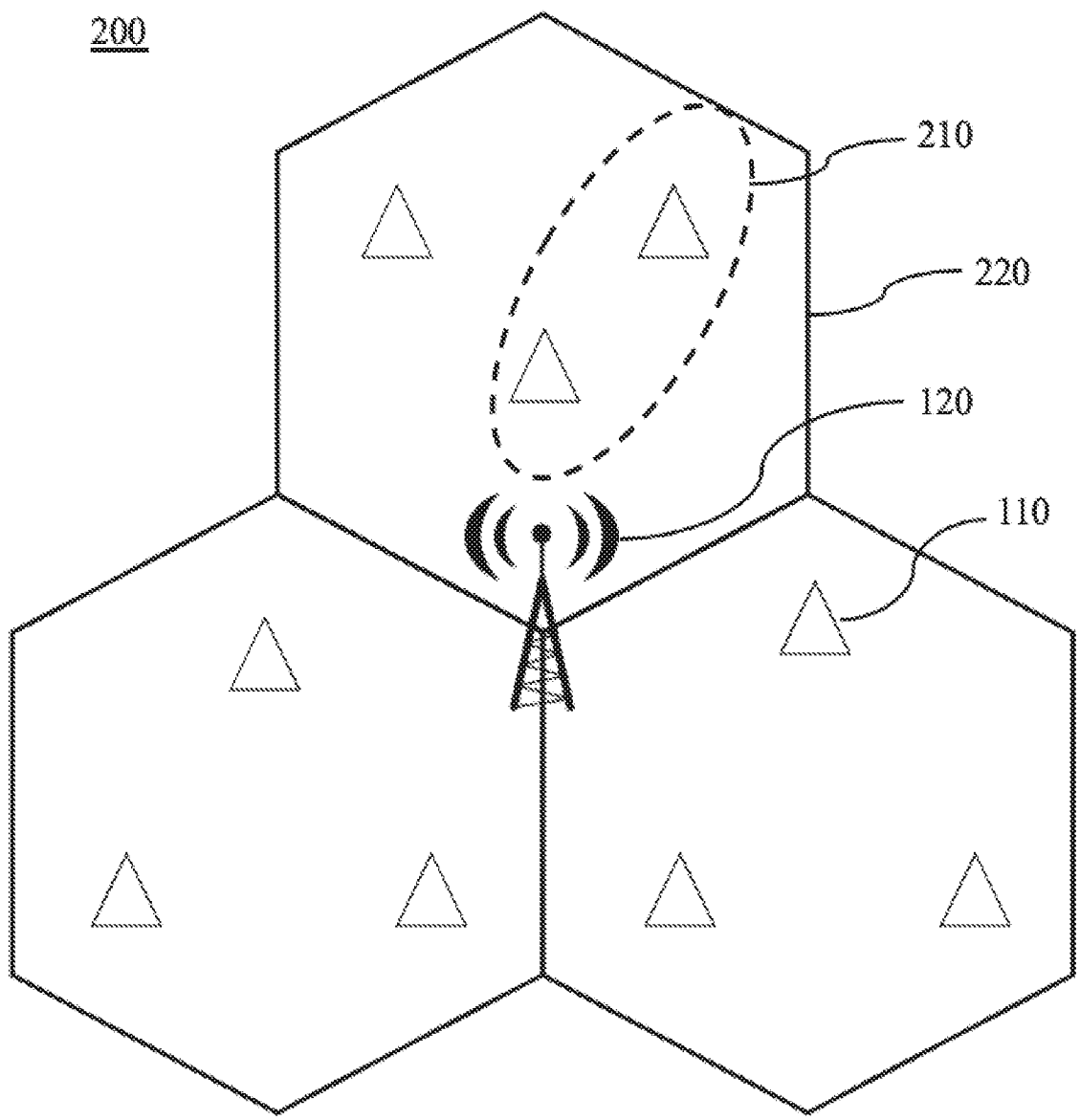
FIG. 2 is schematic of a second embodiment of a system for selective transmission and reception for stationary wireless networks.

FIG. 2 illustrates an enlarged view of the end user equipment 110 and the primary base station 120 included in the selective wireless transmission system 100 according to an embodiment of the present invention. The selective wireless transmission system 100 further involves two main components: a beam 210 and a base station sector 220. In an embodiment of the selective wireless transmission system 100, the primary base station 120 transmits a transmission using a plurality of primary base station antenna 121 which are either omnidirectional or are divided into three primary base station sectors 220 each with coverage of 120 degrees. One of the primary base station antenna 121 monitors for transmissions from the whole base station sector 220 while the other two primary base station antennas 121 are used to form a beam 210 that amplifies the transmissions and receptions for a small angular section of that sector.

In operation, the primary base station sector 220 forms a beam 210 with a plurality of antenna 121 using standard beamforming techniques. The width of the main lobe can be selected by the network operator depending on deployment data. The beam 210 is aimed at various directions effectively turning on transmission and reception only for that direction. Transmissions from the end user equipment 110 within this group will be beamformed for improved reception by the primary base station 120. The primary base station 120, containing multiple antennas, provides designers with an additional degree of freedom through beamforming while improving the secrecy rate of the underlying transmissions.

In an alternative embodiment of the present invention, the primary base station 120 transmits using a single primary base station antenna 121.

In an alternative embodiment of the present invention, the primary base station 120 transmits using a plurality of primary base station antenna 121 which are either omnidirectional or are divided into any number of base station sectors 220.

FIG. 3A illustrates the server memory 141 that is part of the system 100 (see discussion of FIG. 1). The server memory 141 includes a base station look-up table 305 and a user equipment look-up table 320. The base station look-up table 310 includes a base station location data 310 and a base station identification data 315. The user equipment look-up table 320 includes a user equipment location data 325, a time slot data 330, and a user equipment identification data 335.

In operation, upon installation of a new primary base station 132, the primary base station 120 searches for the selective server 140. The primary base station 120 is then configured to connect with the selective server 140 during the installation and provisioning process. The base station transmitter 124 transmits a base station location data 310 and a base station identification data 315 to the server communication module 143. The server processor 142 receives the base station location data 310 and the base station identification data 315 from the server communication module 143. The server processor 142 stores the base station location data 310 and the base station identification data 315 to the server memory 141 in the base station look up table 305. In an embodiment, the base station location data 310 is in string format and is retrieved from the primary base station memory 125. In an embodiment, the base station identification data 315 is in string format and is retrieved from the primary base station memory 125.

In further operation, upon installation of a new end user equipment 110, the end user equipment 110 is configured to connect with the selective server 140. The end user equipment transmitter 112 transmits a test call to the server communication module 143. The server processor 142 receives the test call from the server communication module 143. The server processor 142 extracts the user equipment location data 325 and the user equipment identification data 335 from the test call. The server processor 142 stores the user equipment location data 325 and the user equipment identification data 335 to the server memory 141 in the user equipment look up table 320. The time slot data 330 includes a pre-defined period where an end user equipment 110 is eligible to transmit based on the location of the end user equipment 110. (See discussion in FIG. 1). In an embodiment, the user equipment location data 325 is in string format and is retrieved from the end user equipment memory 114. In an embodiment, the user equipment identification data 335 is in string format and is retrieved from the end user equipment memory 114. In an embodiment, the time slot data 330 is in time format and is retrieved from the selective server 140.

Figure 3B:
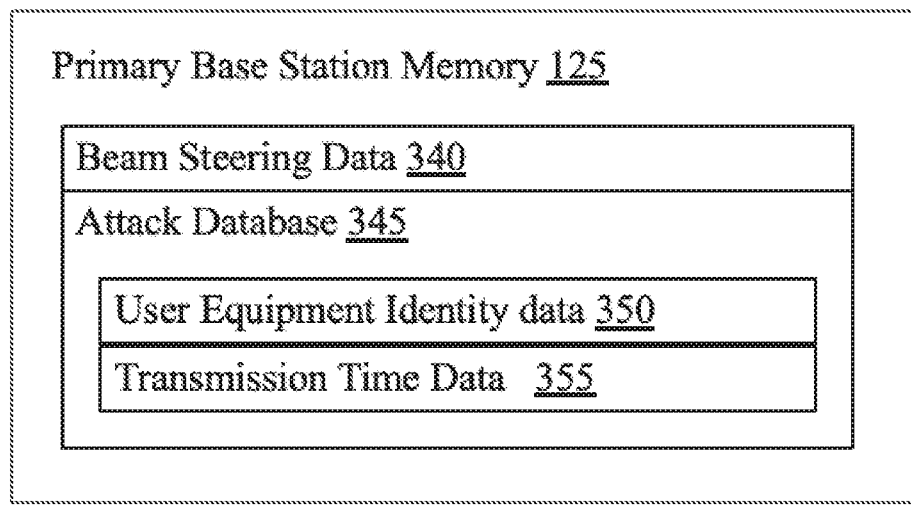
FIG. 3B illustrates the base station memory of the base station according to an embodiment of the present invention.

FIG. 3B illustrates the primary base station memory that is part of the system 100. (See discussion of FIG. 1). The primary base station memory 125 includes a beam steering data 340, and an attack database 345. The attack database 345 further includes a user equipment identity data 350 and a transmission time data 355.

In operation, the primary base station processor 126 calculates the direction that the beam 210 based on the transmission needs from the end user equipment 110, allocated slots based on the location of the primary base station 120 (base station location data 310), and the need to share spectrum with other networks. This calculated direction is stored to the base station memory 125 as beam steering data 340. The primary base station processor 126 retrieves the beam steering data 340 from the primary base station memory 125 and steers the beam 210 accordingly. In an embodiment, the beam steering data 340 is in double format and is retrieved from the primary base station 120.

In further operation, the primary base station 120 monitors for all transmissions from the end user equipment 110 that are allocated to specific slots in the radio frame. The primary base station 120 then determines whether a given transmission is not contained within the time slot data 330. Specifically, the selective server 140 transmits the time slot data 330 to the primary base station 120. If the transmission is not a pre-allocated timeslot, the primary base station 120 discontinues the processing of the transmissions and sends an alert to the network operator. The primary base station 120 stores the data from the illegal transmissions as user equipment identity data 350 and transmission time data 355, for subsequent forensic analysis of possible attacks by spoofing a legal user in the primary base station memory 125 in the attack database 380. In an embodiment, the user equipment identity data 350 is in string format and is retrieved from the primary base station 120. In an embodiment, the transmission time data 355 is in string format and is retrieved from the primary base station 120.

In an alternative embodiment of the present invention, the server memory 141 includes, but is not limited to, a public encryption key protocol or other types of encryption services.

Figure 4:
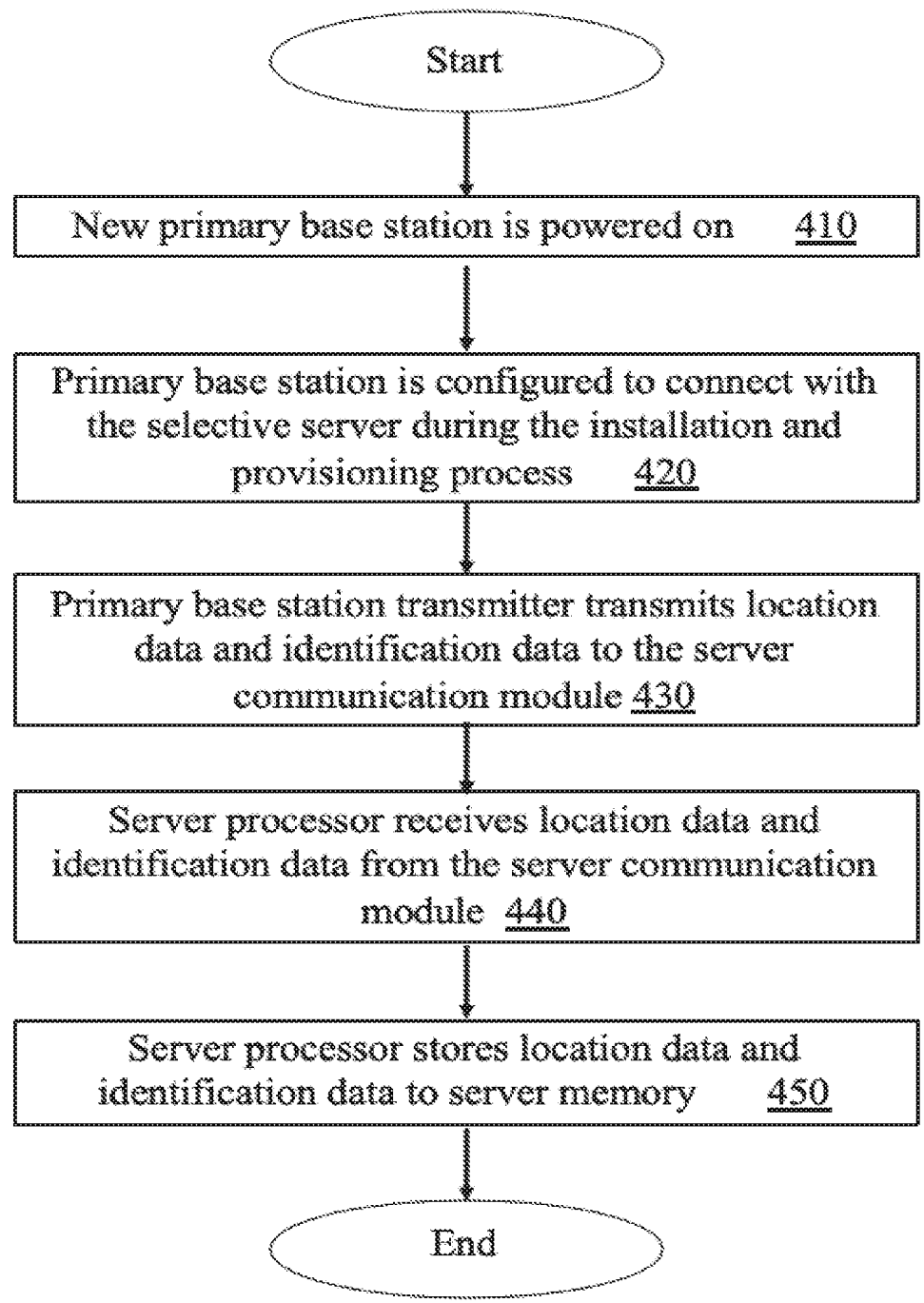
FIG. 4 is a flowchart of an embodiment of a method for adding a new primary base station within the method described in FIG. 7 according to an embodiment of the present invention.

FIG. 4 illustrates a flowchart 400 of a process for adding a new primary base station. The process shown in the flowchart 400 involves steps at the primary base station 120 and the selective server 140.

At the first step 410, a new primary base station 120 is powered on. Next, at step 420, the primary base station 120 is configured to connect with the selective server 140 during the installation and provisioning process. Next, at step 430, the primary base station transmitter 124 transmits a primary base station location data 310 and a primary base station identification data 315 to the server communication module 143. Next, at step 440, the server processor 142 receives the primary base station location data 310 and the primary base station identification data 315 from the communication module 143. Finally, at step 450, the server processor 142 stores the primary base station location data 310 and the primary base station identification data 315 to the server memory 191 in the primary base station look up table 305.

Figure 5:
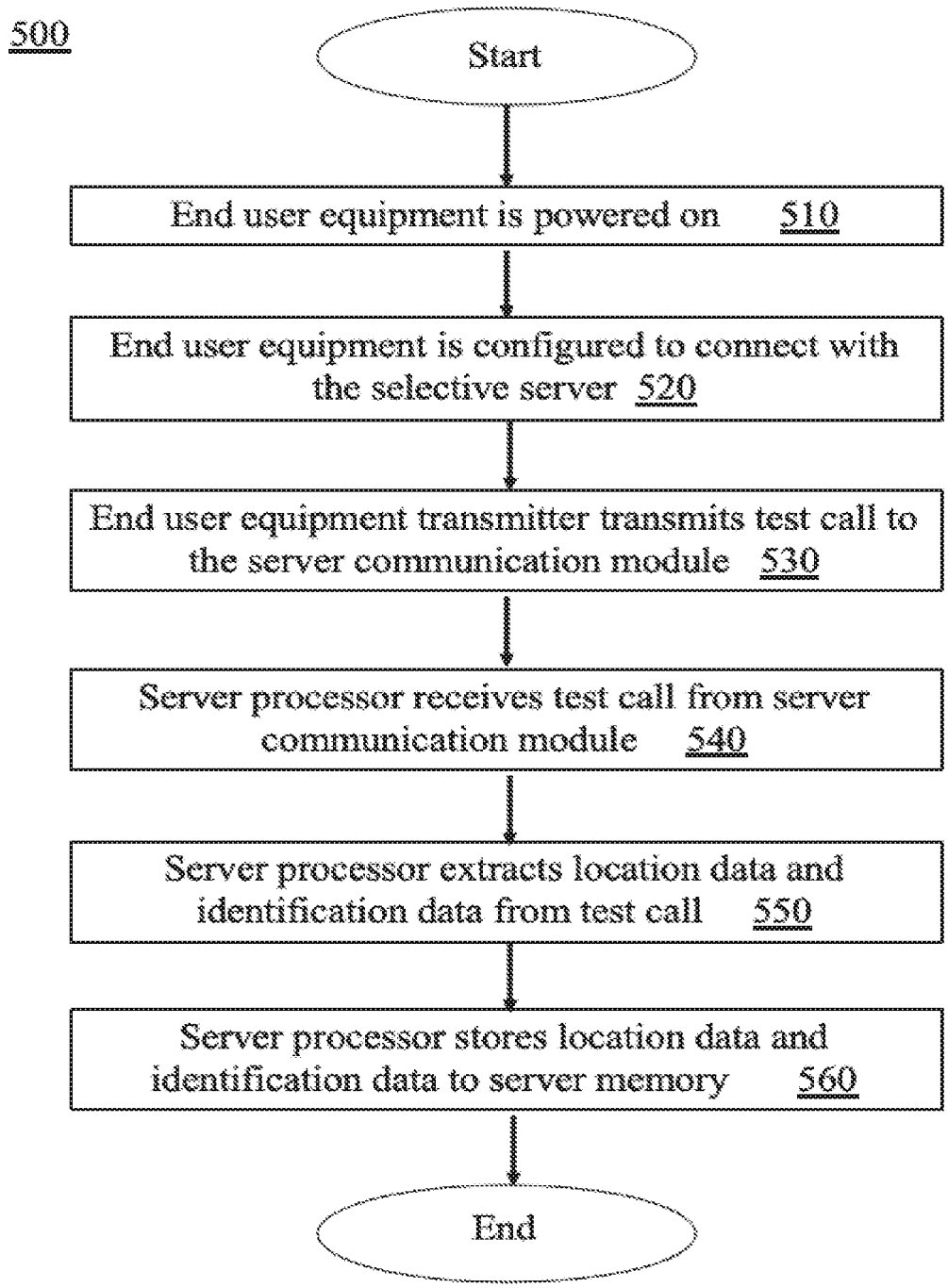
FIG. 5 is a flowchart of an embodiment of a method for adding a new end user equipment within the method described in FIG. 7 according to an embodiment of the present invention.

FIG. 5 illustrates a flowchart 500 of a process for adding a new end user equipment. The process shown in the flowchart 500 involves steps at the end user equipment 110 and the selective server 140.

At the first step 510, a new end user equipment 110 is powered on. Next, at step 520, the end user equipment 110 is configured to connect with the selective server 140 during the installation and provisioning process. Next, at step 530, the end user equipment transmitter 112 transmits a test call to the server communication module 143. Next, at step 540, the server processor 142 receives the test call from the server communication module 143. Next, at step 550, the server processor 142 extracts a user equipment location data 325 and a user equipment identification data 335 from the test call. Finally, at step 560, the server processor 142 stores the user equipment location data 325 and the user equipment identification data 335 to the server memory 141 in the user equipment look up table 320.

Figure 6:
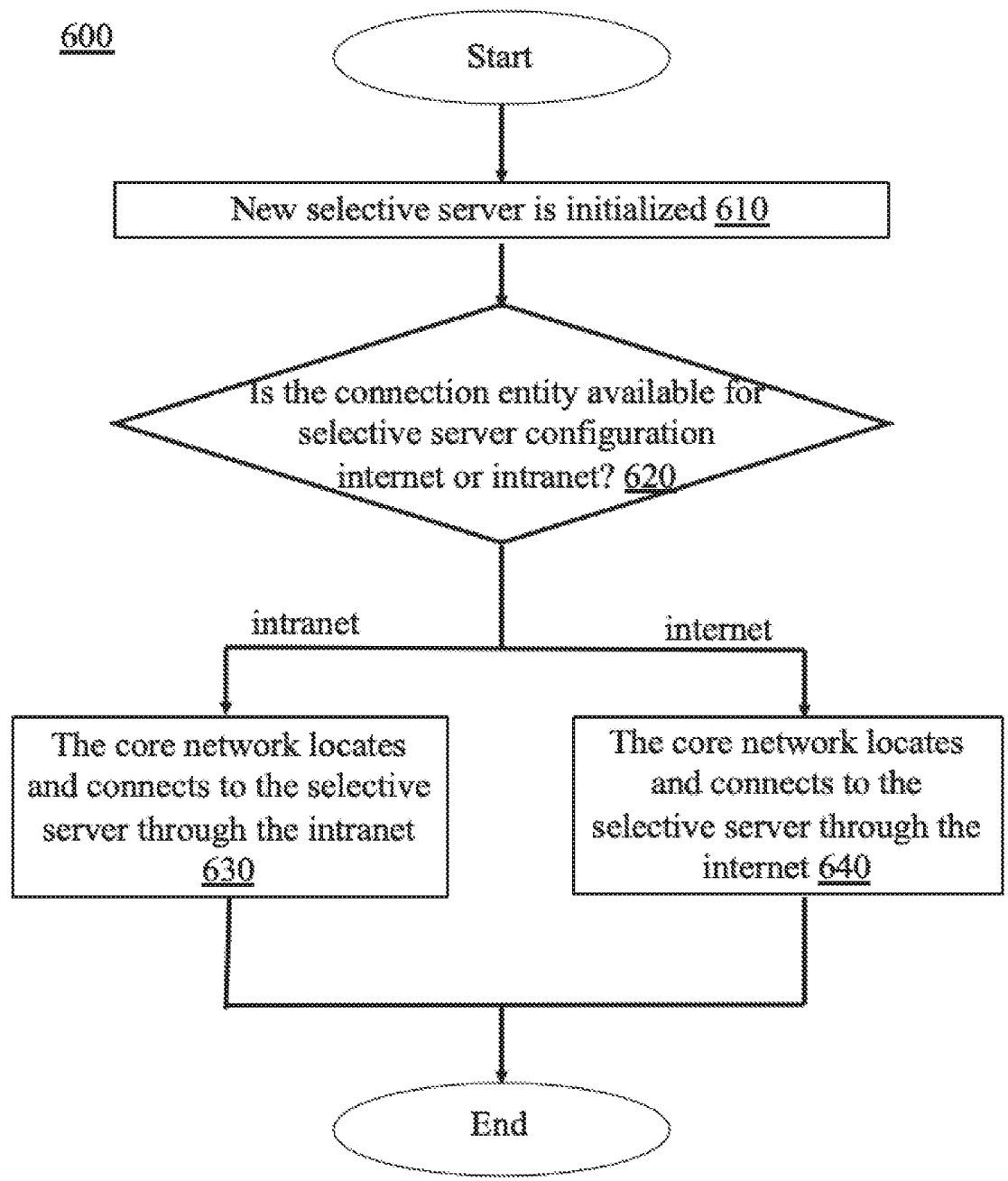
FIG. 6 is a flowchart of an embodiment of a method for adding a new selective server within the method described in FIG. 7 according to an embodiment of the present invention.

FIG. 6 illustrates a flowchart 600 of a process for adding a new selective server. The process shown in the flowchart 600 involves steps at the selective server 140, the cellular network 130, and the connection entity 150.

At the first step 610, a new selective server 140 is powered on. Next, at step 620, the core network 130 determines whether the connection entity 150 is available for the configuration of the selective server 140 is internet or intranet. If the connection entity 150 is intranet, then the core network 130 proceeds to step 630. At step 630, the core network 130 locates and connects to the selective server 140 through the intranet. If the connection entity 150 is internet, then the core network 130 proceeds to step 640. At step 640, the core network 130 locates and connects to the selective server 140 through the internet. A connection through the internet provides the flexibility to further centralize the selective server 140 where it can connect to multiple core networks 130.

Figure 7:
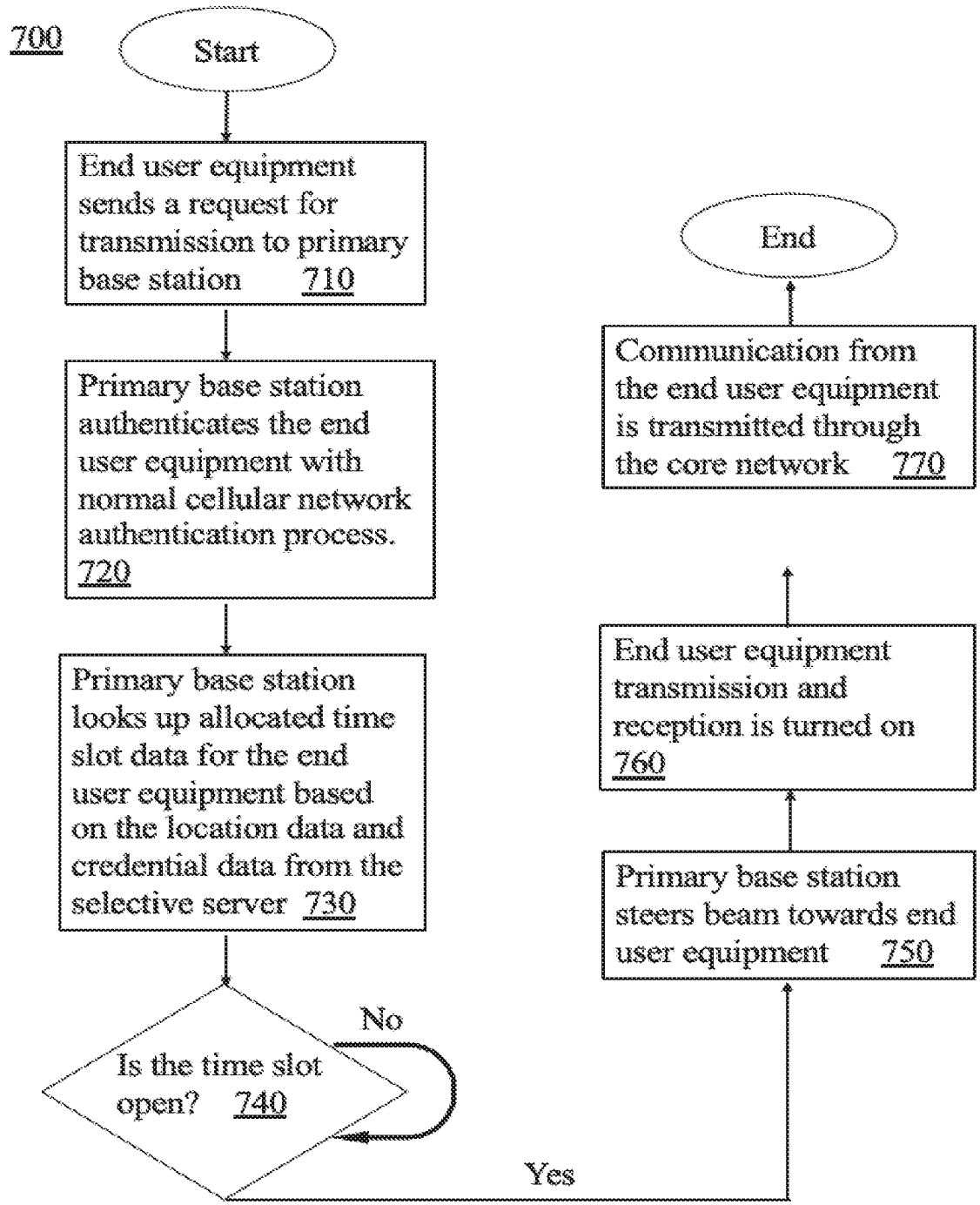
FIG. 7 is a flowchart of an embodiment of a method for transmitting a transmission from an end user equipment according to an embodiment of the present invention.

FIG. 7 illustrates a flowchart 700 of a process for transmitting a transmission from an end user equipment. The process shown in the flowchart 700 involves steps at the end user equipment 110, the primary base station 120, the cellular network 130, and the selective server 140.

First at step 710, the end user equipment transmitter 112 transmits a request for transmission to the primary base station receiver 123. Next, at step 720, the primary base station processor 126 authenticates the end user equipment 110 with a normal cellular network authentication process. Specifically, the core network 130 is a network that uses Internet Protocol (IP) and Ethernet-based packet switched transmission. The primary base station 120 transmits the user equipment identification data 335 to the mobility management entity 132. The mobility management entity 132 is the key control-node for the LTE access-network responsible for authenticating the user by interacting with the home subscriber server 131. The home subscriber server 131 is responsible for idle mode end user equipment 110 tracking and paging procedure including retransmissions. Mobility management schemes are used to ensure connectivity and to keep the IP addresses of users unchanged, even when the end user equipment 110 move and changes its network. The home subscriber server 131 is a central database that contains information about all of the network operators' subscribers for handing calls and sessions. The core network 130 determines whether the user equipment identification data 335 is contained within the home subscriber server 131. If the user equipment identification data 335 is contained within the home subscriber server 131, then the end user equipment 110 is successfully authenticated.

Next, at step 730, the primary base station 120 looks up the time slot data 330 for the end user equipment 110 based on the user equipment location data 325 and the user equipment identification data 335 from the user equipment look up table 320 in the server memory 141. Next, at step 740, the primary base station processor 126 determines whether the requested time slot is open for transmission. If no, then the primary base station processor 126 waits until the time slot becomes available. If yes, then the primary base station processor 126 proceeds to step 750. Next, at step 750, the primary base station 120 steers the beam 210 towards the end user equipment 110. Next, at step 760, the transmission and reception from the end user equipment 110 is enabled. Next, at step 770, the transmission from the end user equipment 110 is transmitted through the core network 130 (see discussion in FIG. 1).

Figure 8:
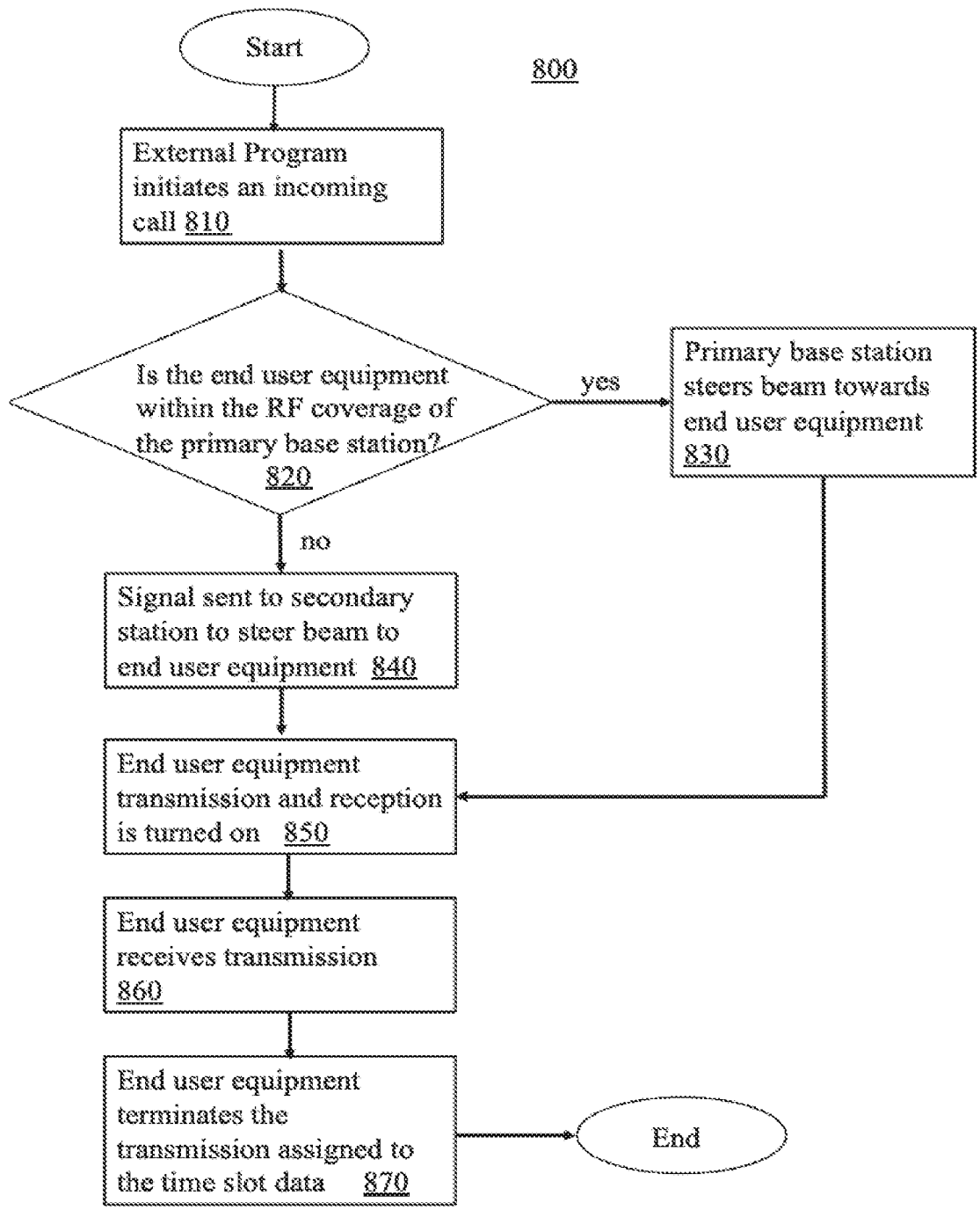
FIG. 8 is a flowchart of an embodiment of a method for receiving a transmission to an end user equipment according to an embodiment of the present invention.

FIG. 8 illustrates a flowchart 800 of a process for receiving a transmission from an end user equipment. The process shown in the flowchart 800 involves steps at the end user equipment 110, the primary base station 120, the secondary base station 160, and the cellular network 130.

First, at step 810, an external program initiates an incoming call. Next, at step 820, the core network 130 determines whether the end user equipment 110 is within the same RF coverage as the primary base station 120. If yes, then the core network 130 proceeds to step 830. At step 830, the core network 130 transmits a signal to the primary base station 120 to steer the beam 210 towards the end user equipment 110. The primary base station 120 steers the beam 210 to the end user equipment 110. The primary base station 120 then proceeds to step 850. If no, then the core network 130 proceeds to step 840. At step 840, the core network 130 transmits a signal to the secondary base station 160 to steer the beam 210 towards the end user equipment 110. The secondary base station 160 steers the beam 210 to the end user equipment 110. Next, at step 850, the transmission and the reception of the end user equipment 110 is turned on. Next, at step 860, the end user equipment receiver 113 receives the transmission. Finally, at step 870, the end user equipment 110 sends a signal to the core network 130 to terminate the transmission assigned to the time slot data 330.

Figure 9:
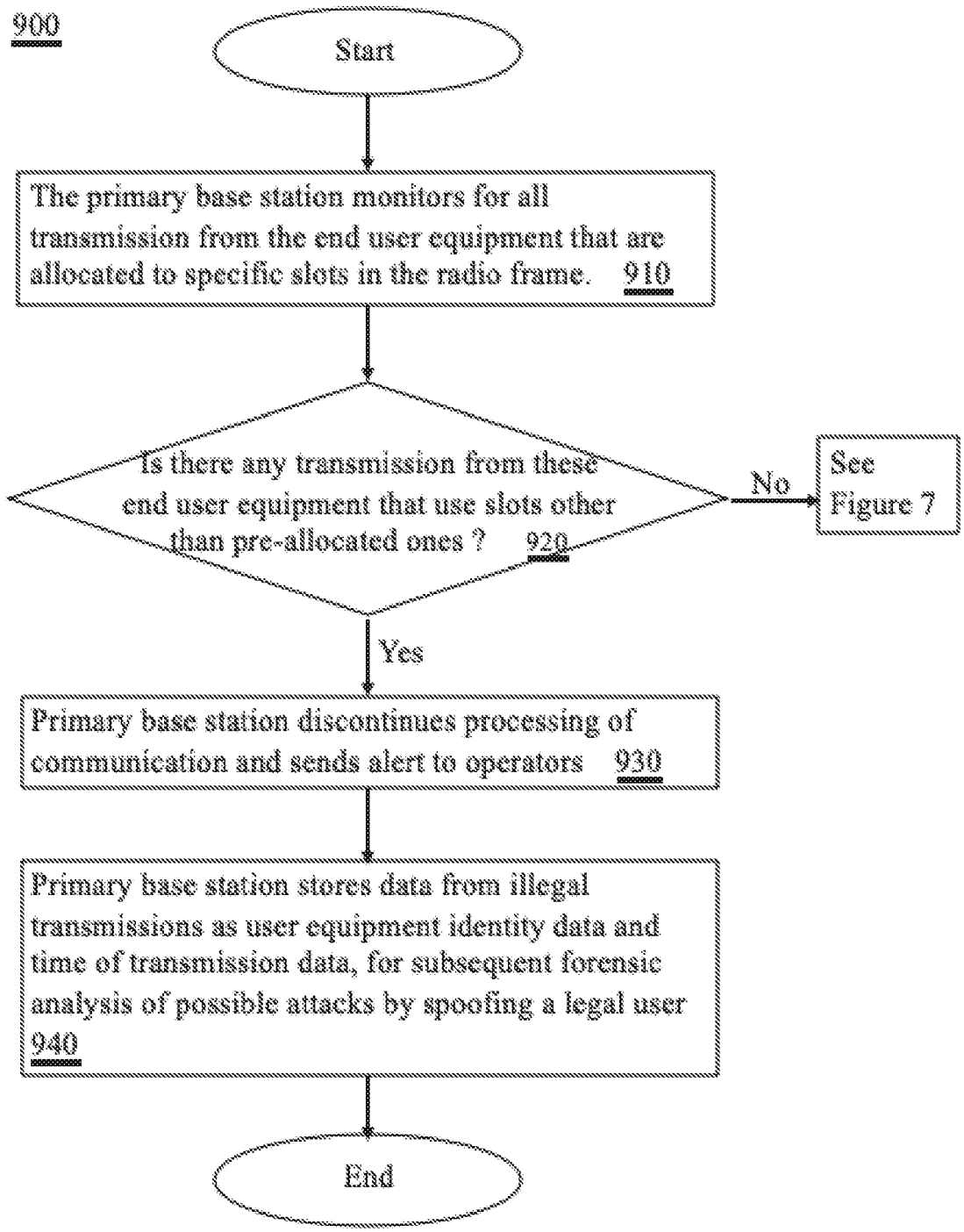
FIG. 9 is a flowchart of an embodiment of a method for intruder listening performed by the primary base station according to an embodiment of the present invention.

FIG. 9 illustrates a flowchart 900 of a process of intruder listening performed by the primary base station. The process shown in the flowchart 900 involves steps at the end user equipment 110, the primary base station 120 and the selective server 140.

First, at step 910, the primary base station 120 monitors for all transmissions from the end user equipment 110 that are allocated to specific slots in the radio frame. Next, at step 920, the primary base station 120 determines whether there are any transmissions from the end user equipment 110 that use slots other than pre-allocated ones. Specifically, the selective server 140 transmits the time slot data 330 to the primary base station 120. The primary base station 120 then determines whether a given transmission is not contained within the time slot data 330. If no, then the primary base station 120 proceeds to the steps detailed in FIG. 6. If yes, then the primary base station 120 proceeds to step 930. At step 930, the primary base station 120 discontinues the processing of the transmission and sends an alert to the network operator. Finally, at step 940, the primary base station 120 stores the data from the illegal transmissions as user equipment identity data 350 and transmission time data 355, for subsequent forensic analysis of possible attacks by spoofing a legal user in the primary base station memory 125 in the attack database 380.

Any element in a claim that does not explicitly state "means for" performing a specified function, or "step for" performing a specific function, is not to be interpreted as a "means" or "step" clause as specified in 35 U.S.C. § 112, ¶6.

In particular, the use of "step of" in the claims herein is not intended to invoke the provisions of 35 U.S.C. § 112, ¶6.

The invention claimed is:

1. A selective wireless transmission system, the system including:
    an end user equipment, a primary base station, a core network, and a selective server;
    the end user equipment transmits a request for transmission to the primary base station receiver;
    the primary base station authenticates the end user equipment using a cellular network authentication process, searches for a time slot data for the end user equipment from the selective server, determines whether the time slot is open for transmission, steers a beam towards the end user equipment when time slot is open for transmission, and enables transmission from the end user equipment, wherein the enabling is performed by the primary base station; and
    the core network receives transmission from the end user equipment.

2. The system of claim 1, the system further including:
    an external program initiates an incoming call;
    the core network determines whether an end user equipment is transmitting the incoming transmission to the primary base station, if the primary base station is being transmitted to, the core network transmits a signal to the primary base station to steer the beam towards the end user equipment; and
    the primary base station steers the beam towards the end user equipment when time slot is open for transmission and enables transmission from the end user equipment.

3. The system of claim 2, the system further including
    the core network transmits the signal to a secondary base station to steer the beam towards the end user equipment when the end user equipment is not within the same coverage as the primary base station; and
    the secondary base station steers the beam towards the end user equipment when time slot is open for transmission and enables transmission from the end user equipment.

4. The system of claim 3, wherein the primary base station and the secondary base station is stationary.

5. The system of claim 1, wherein the selective server calculates a time slot data based on a time period to cover the entire Radio Frequency (RF) coverage area by the primary base station and the time period to cover one group of end user equipment.

6. The system of claim 1, wherein the selective server is connected to a plurality of core networks.

7. A method of selective wireless transmission system, the method including:
    transmitting, by an end user equipment, a request for transmission to a primary base station receiver;
    authenticating the end user equipment with a cellular network authentication process, wherein the authentication process is performed by a primary base station processor;
    searching a time slot data for the end user equipment from a selective server memory, wherein the searching is performed by the primary base station processor;
    determining whether the time slot is open for transmission, wherein the determining is performed by the primary base station processor;
    steering a beam towards the end user equipment when the time slot is open for transmission, wherein the steering is performed by a primary base station;
    enabling transmission from the end user equipment, wherein the enabling is performed by the primary base station; and
    transmitting the transmission by the end user equipment through a core network.

8. The method of claim 7, the method further including initiating an incoming transmission, wherein the initiating is performed by an external program;
    determining whether an end user equipment is transmitting the incoming transmission to the primary base station, wherein the determining is performed by a core network;
    transmitting a signal to the primary base station to steer the beam towards the end user equipment when the end user equipment is transmitting the incoming transmission to the primary base station, wherein the transmitting of the signal to the primary base station is performed by the core network;
    enabling reception of the signal by the end user equipment, wherein the enabling is performed by the primary base station;
    receiving the signal, wherein the receiving is performed by an end user equipment receiver; and
    transmitting the signal to the core network to terminate the transmission assigned to the time slot data, wherein the transmitting of the signal to the core network is performed by the end user equipment transmitter.

9. The method of claim 8, the method further including transmitting the signal to a secondary base station to steer the beam towards the end user equipment when the end user equipment is not transmitting the incoming transmission to the primary base station, the transmitting of the signal to the secondary base station is performed by the core network.

10. The method of claim 7, the method further including configuring the primary base station to connect with a selective server during an installation and provisioning process, wherein the configuring is performed by the primary base station;
    transmitting a primary base station location data and a primary base station identification data to the selective server, wherein the transmitting of the primary base station location data and primary base station identification data is performed by a primary base station transmitter;
    receiving the primary base station location data and the primary base station identification data, wherein the receiving of the primary base station location data and the primary base station identification data is performed by the selective server; and
    storing the primary base station location data and the primary base station identification data to the selective server memory, wherein the storing is performed by the selective server.

11. The method of claim 10, the method further including:
    configuring the end user equipment to connect with the selective server during the installation and provisioning process, wherein the configuring is performed by the primary base station;
    transmitting a test call to the selective server, wherein the transmitting the test call to the selective server is performed by the end user equipment transmitter;
    receiving the test call, wherein the receiving the test call is performed by the selective server;

extracting a user equipment location data and a user equipment identification data from the test call, wherein the extracting is performed by the selective server; and storing the user equipment location data and the user equipment identification data to the server memory, wherein the storing is performed by the selective server.

12. The method of claim 7, the method further including:

determining whether a connection entity is available for the configuration of the selective server, wherein the determining is performed by the selective server; and locating and connecting to the selective server when the connection entity is intranet, wherein the locating and connecting is performed by the core network.

13. The method of claim 12, the method further including:

locating and connecting to the selective server when the connection entity is internet, wherein the locating and connecting is performed by the core network.

* * * * *